Figure 1:
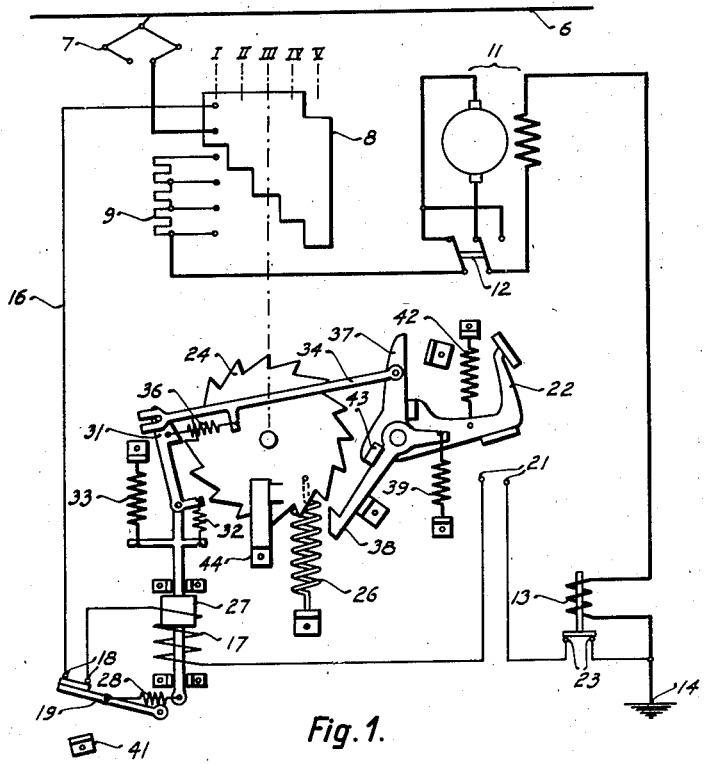

Nov. 13, 1934. T. BUCHHOLD 1,980,951
MOTOR CONTROL SYSTEM
Filed Oct. 3, 1930 2 Sheets-Sheet 1

Inventor
Theodor Buchhold
By [signature]
Attorney

Nov. 13, 1934.   T. BUCHHOLD   1,980,951
MOTOR CONTROL SYSTEM
Filed Oct. 3, 1930   2 Sheets-Sheet 2

Inventor
Theodor Buchhold
By ◌◌◌◌◌◌
Attorney

Patented Nov. 13, 1934

1,980,951

UNITED STATES PATENT OFFICE 1,980,951

MOTOR CONTROL SYSTEM

Theodor Buchhold, Mannheim-Neuostheim, Germany, assignor to Aktiengesellschaft Brown, Boveri & Cie., Baden, Switzerland, a joint-stock company of Switzerland Application October 3, 1930, Serial No. 486,121
In Germany October 7, 1929

6 Claims. (Cl. 172—288)

This invention relates to improvements in means for the step-by-step operation of the controller drums of electrically driven vehicles and particularly to a system for electrically operating the drum either completely automatically, or automatically in response to manual initiation of the operation.

The traction motors of electrically driven vehicles are usually controlled by a drum controller which is rotated by electric or fluid motors which are electrically or electro-pneumatically controlled to obtain a step-by-step rotation of the controller. Such installations are impractical for some purposes and are expensive in all cases. When electric motors are used to rotate the control drums, special means must be provided to stop the operating motor immediately after disconnecting which renders its operation unsatisfactory. The use of an electro-pneumatic foot pedal control for the fluid motor operating the controller is particularly undesirable for vehicles which must be steered because such control distracts the operator's attention from steering especially when the pressure of the foot must be varied to vary the control operation. It is, therefore, desirable that the controller drum be rotated in a step-by-step manner either entirely automatically when the current connection is completed or by a single movement of a foot control.

It is, therefore, among the objects of the present invention to provide an improved controller operating system in which the controller is moved in step-by-step manner.

Another object of the invention is to provide an improved controller operating system in which the movement of the controller in step-by-step manner is automatically continued after initiation of such movement.

Another object of the invention is to provide an improved controller operating system in which the controller is automatically moved in step-by-step manner by electrically operated means.

Another object of the invention is to provide an improved controller operating system in which the controller is moved automatically in step-by-step manner by electrically operated means actuating an intermediate rotating device.

Another object of the invention is to provide an improved controller operating system in which the controller is moved in step-by-step manner automatically by electrically operated means which are automatically controlled to prevent too rapid increase of the current.

Another object of the invention is to provide an improved controller operating system in which the controller is moved in step-by-step manner by electrically operated means which are automatically made ineffective in the end position of the controller movement.

Another object of the invention is to provide an improved controller operating system in which the controller is automatically moved in step-by-step manner by electrically operated means automatically controlled and in which the controller is automatically returned to the neutral position upon release of the movement initiating means.

Objects and advantages, other than those above set forth, will be apparent from the following description when read in connection with the accompanying drawings in which Figure 1 is a diagrammatic illustration of the electric connections and the mechanical elements for obtaining a step-by-step movement of the controller drum as one embodiment of the invention in which the drum movement is initiated by a single movement of a foot pedal.

Figure 2:
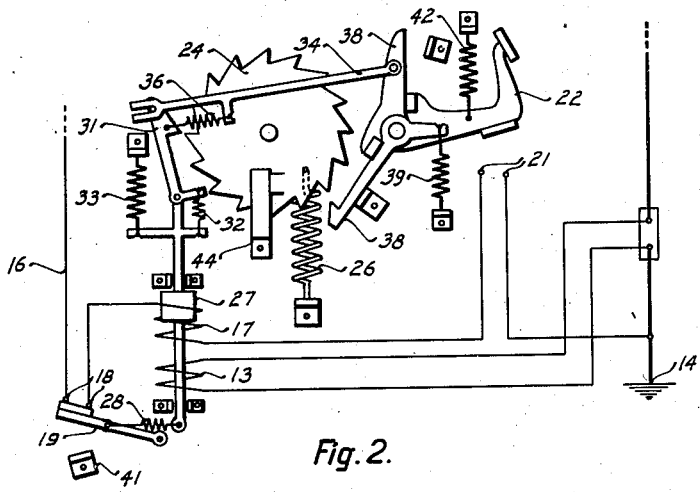
Figure 3:
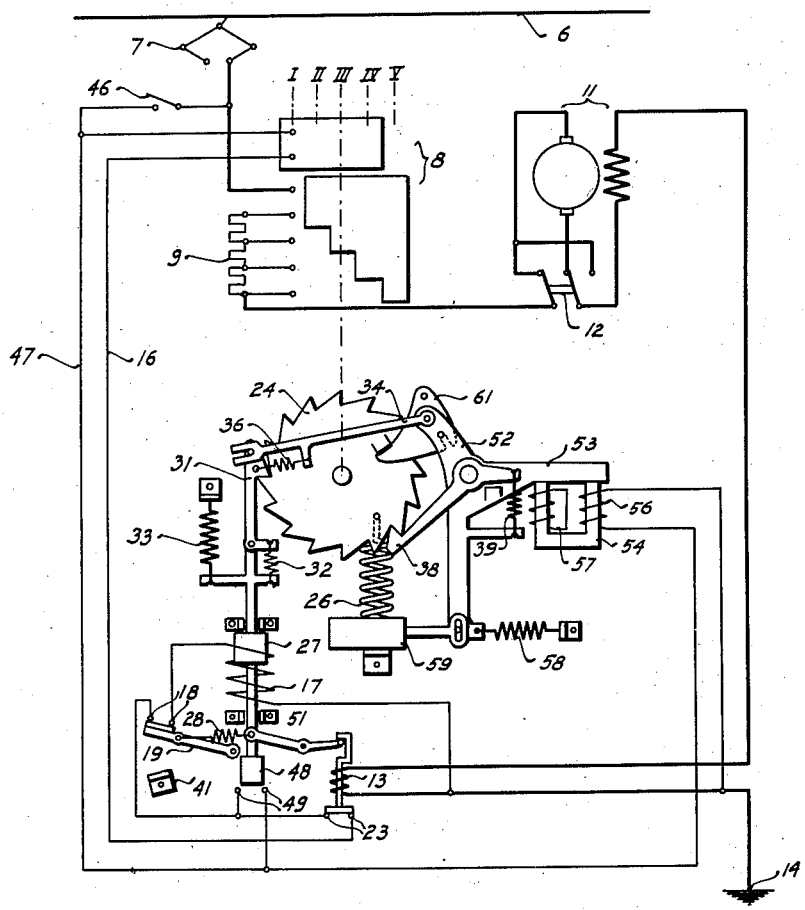
Figure 4:
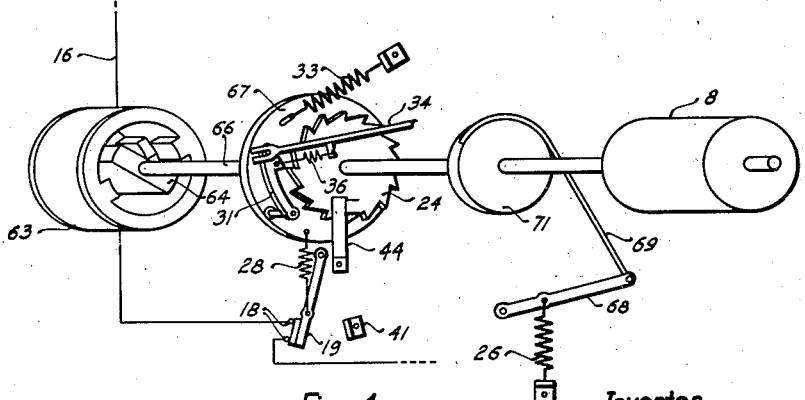

Fig. 2 is a modification of the system shown in Fig. 1 in which one pair of contacts is omitted and the device protecting the motors against too rapid increase of current is combined with the drum operating means, Fig. 3 is a view similar to that shown in Fig. 1 with the change, however, that the embodiment herein shown operates full automatically, and Fig. 4 is a perspective view of one means for securing rotation of the drums together with a spring arrangement whereby the force tending to return the drum to its zero position is substantially uniform throughout its entire range of movement.

Referring more particularly to the drawings by characters of reference, the reference numeral 6 designates a supply line such as an overhead trolley line having a current collector 7 moving in contact therewith and transmitting current to a control drum 8 (shown developed) which has a number of control positions I, II, III, IV and V. It will be understood that line 6 and collector 7 may be replaced by any other suitable source of electric current such as a storage battery. When the controller 8 is in position II current may flow through a starting resistance 9 which is connected with a traction motor 11 by way of a reversing switch 12, through the coil of a relay 13 and to ground as at 14. The structure above described is applicable to either a vehicle running on a track or a vehicle which must be steered. The mechanism for obtaining a step-by-step movement of the control drum is, however, slightly different for the two types of vehicles above-mentioned as may be seen by a comparison of Figs. 1 and 3 and will therefore be considered separately.

For vehicles which must be steered, it is, of course, necessary that initiation of the controller movements be possible by the use of a foot pedal. Fig. 1 illustrates one mechanism by which such operation is obtainable in which figure the entire system is shown in the inoperative position. An auxiliary conductor 16 is arranged to receive current when controller 8 is in position I and to energize a coil 17 of a relay providing contacts 18 are closed by a member 19, contacts 21 are closed by a contact member on a foot pedal 22 and contacts 23 are closed by the current relay 13. A ratchet wheel 24 is mounted on the axle of the controller 8 and is provided with a spring 26 tending to return the drum 8 into its neutral position when the ratchet 24 is disengaged from a latch mechanism to be hereinafter described. An armature 27 movable by the coil 17 is connected at its lower end by a spring 28 with the member 19 for bridging the contacts 18. The upper end of the armature 27 has pivotally attached thereto a pawl 31 tending, due to the action of the spring 32, to engage and to move ratchet 24 in a counter-clockwise direction against the action of spring 26 when the armature 27 is drawn downwardly by energization of coil 17. The pawl 31 is disengageable from the ratchet 24 by movement of a rod 34 having a forked end engaging a pin on the pawl 31 which pin is held in contact with the forked end of rod 34 by a spring 36. The rod 34 is connected with a lever 37 pivotally mounted with and operable by the foot pedal 22. A latch 38, also mounted with the foot pedal 22, is under the tension of a spring 39 tending to cause engagement of the latch 38 with the ratchet 24. The foot pedal 22, lever 37 and latch 38 cooperate to produce their several effects as will appear hereinafter.

Considering the arrangement in the position shown in Fig. 1, which is the neutral position for the entire system; when it is desired to cause movement of the drum 8, the foot pedal 22 is depressed to bridge contacts 21. Depression of the pedal 22 simultaneously causes engagement of latch 38 with ratchet 24 and movement of rod 34 toward the right thereby permitting engagement of pawl 31 with ratchet 24. Rod 34 having been moved toward the right, pawl 31 is free to engage and disengage ratchet 24, upon energization of coil 17, under the action of springs 32 and 33. The drum 8 being now in position I, a current flows from supply line 6 over collector 7, drum 8, conductor 16, contacts 18, coil 17, contacts 21 and 23 to ground. Armature 27 is therefore drawn downwardly by coil 17 and, pawl 31 being engaged in ratchet 24, moves drum 8 one step in a counter-clockwise direction into position II. Downward movement of armature 27 moves spring 28 over the pivoting point of member 19 and causes the member to snap down against a stop 41. The circuit to coil 17 is thereby interrupted and armature 27 is raised by spring 33 whereby pawl 31 again engages a notch of ratchet 24. Upward movement of armature 27 permits return of spring 28 and member 19 to the position shown in Fig. 1 whereupon the above action is repeated until the drum 8 has been rotated into position V in which position connection between supply line 6 and conductor 16 is broken. It will be understood that pedal 22 has been previously depressed to close contacts 21 and to cause engagement of latch 38 with ratchet 24 during the above cycle of operation and that current relay 13 may have been energized by an excessive current flowing through the motor 11 which would raise relay 13 thereby opening contacts 23. The relay 13 thus operates to automatically prevent too rapid rotation of drum 8 which would cause excessively rapidly increasing current flow through the motors. As soon as foot pedal 22 is released the tension of spring 42 raises the pedal to open the contacts 21. Partial release only of foot pedal 22 breaks the circuit to coils 17 and contacts 21 and interrupts the switching movement of drum 8 while latch 38 retains the ratchet and drum in the position reached before opening of the contacts 21 under the action of the spring 39. The current supplied to motor 11 can thus be regulated as desired by retaining the drum 8 in any one of its positions. Complete raising of pedal 22 causes counterclockwise rotation of lever 37 which is provided with a stop 43 arranged to engage latch 38 and thereby disengages the latch from the ratchet. The movement of lever 37, through rod 34, disengages pawl 31 from the ratchet against the force of spring 32. The ratchet 24 being entirely disengaged, spring 26 now returns the ratchet 24 to its original position against a stop 44 which rotates drum 8 to its neutral position. The entire system is then again in the position shown and the above operation may be repeated until controller drum 8 has reached its last position.

Fig. 2 illustrates a modified form of the system in which one pair of contacts (contacts 23) are eliminated and the coil of relay 13 coacts with coil 17 on armature 27 thereby eliminating a separate current operated protective or speed controlling relay. The modified system operates exactly as above described, excepting that, when armature 27 is attracted by coil 17, controller 8 is moved one step which causes a sudden increase in the motor current. The circuit of coil 17 is then interrupted at 18 but armature 27 is maintained in the attracted position by the action of coil 13 until the motor current has dropped to a value which will cause coil 13 to release the armature and permit the movement of the mechanism to the next step.

A modified system is shown in Fig. 3 which modification is particularly well adapted for use in electric railway cars or trains. Although the motor circuits are the same and the drum rotating mechanisms are similar in operation, as may be seen from reference to like reference numerals in Figs. 1 and 3, the switching mechanism now to be described is entirely automatic in operation and therefore differs somewhat in structure and in operation from that previously illustrated and described. A switch 46 is provided to connect a conductor 47 to the supply line 6 by way of the current collector 7 and forms the means for initiating the operation of the system as will be hereinafter described. The armature 27 of the pawl operating relay is provided at the lower end thereof with a contact member 48 adapted to bridge a pair of contacts 49 arranged in the circuit of coil 17. A pivoted lever 51 is connected with the armature 27 in such relation with the current relay 13 that downward operation of the armature 27 will cause the armature of relay 13 to be moved upwardly so that, if the current in coil 13 is sufficient to maintain its armature in attracted position, such attraction will be insured even if the armature should prove to be mechanically defective. Contact member 48 serves the double purpose of relieving contacts 23 from the function of interrupting current (except when relay 13 operates before movement of armature 27) and of insuring completion of the motion of the armature 27 after initiation of such motion by completing the circuit of coil 17 before it is opened at contact 23. The latch 38 and its spring 39 are mounted with and operable by a pivotally mounted lever 52 connected with rod 34 and having a portion forming an armature 53 for an electromagnet comprising a U-shaped core 54 having a coil 56 connected with ground at 14 and with the voltage source through switch 46 on one leg and a short-circuited coil 57 arranged on the other leg of the core. If the circuit is momentarily broken to coil 56, an induced current will flow into coil 57 thereby retaining armature 53 in its attracted position in spite of the previous failure of coil 56. The latch is therefore retained in engagement with the ratchet and the drum is retained in its previous position in spite of the momentary breaking of the electric circuits for any reason. The lever 52 is connected at its lower end with a spring 58 and a time-delay device 59 such as a dash pot. Both the winding 57 and the dash pot 59 prevent unlatching of the ratchet 24 if the current fails momentarily as when the collector 7 jumps from one section of the line 6 to another. The upper end of lever 52 carries a pin which engages in a notch of a disc segment 61 which serves to cause return of lever 52 and the armature 53 to adjacent the core 54 when the drum 8 returns to the neutral position thereby decreasing the force required from and the size of the magnets 54, 56.

Assuming that the system is in the inoperative position shown (Fig. 3), initiation of operation is obtained by closing of switch 46 which permits a current to flow from line 6 over current collector 7, drum 8, contacts 23 and 18, coil 17 and to ground and also over conductor 47 to coil 56 and ground. Armature 53 is attracted by energization of coil 56 thereby causing latch 38 to engage ratchet 24 and drawing rod 34 to the right which permits pawl 31 to engage the ratchet. Energization of coil 17 drawing armature 27 downwardly thereby rotating ratchet 24 and drum 8 one step in a counter-clockwise direction. Downward movement of armature 27 opens contacts 18 as above described which causes de-energization of coil 17 and return of armature 27 under the action of the spring 33. The spring 32 then causes pawl 31 to reengage ratchet 24 and latch 38 prevents return of the drum, under the action of spring 26. The above cycle of operation continues until the last position of drum 8 is reached whereupon the circuit to coil 17 is broken and the drum remains in the last position until switch 46 is opened thereby breaking the circuit to coil 56 which permits spring 58 to rotate lever 52 and thus disengage latch 38 whereupon spring 26 returns drum 8 to the neutral position and also causes disengagement of pawl 31 from ratchet 24.

Too rapid rotation of drum 8 and, therefore, too rapid and too large current increases are prevented by relay 13 which lifts and breaks the circuit to coil 17 when the current flowing through the controller exceeds a permissible limit. If the permissible value is not exceeded, armature 27 operates, closes contacts 49 and lifts the armature of relay 13 thereby opening contacts 23 which are without current. If the motor current then increases the armature of relay 13 will remain in attracted position.

It is also possible to substitute a rotating magnet of any well-known type for the reciprocating pawl operating magnet shown and above described. Fig. 4 shows the use of such magnet and also an arrangement of the drum returning spring which insures a substantially constant torque over the whole travel of the drum. The rotating magnet includes a stationary coil or coils 63 and a rotating armature 64 connected with a shaft 66. A disc 67 is secured upon the shaft 66 and pivotally carries the pawl 31. The disc return spring 33 is attached tangentially to the disc 67 and the spring 28 for the circuit interrupting switch 19 is likewise suitably attached to the same disc. To obtain uniform torque of the spring 26, the movable end of the spring is fastened to a pivoted lever 68 which acts through a cord or other suitable means 69 on a disc or drum 71 mounted on shaft 66. The torque obtained from the spring and the lever is then substantially constant, the lever arm of the spring decreasing as the tension thereof increases and vice versa.

It will thus be seen that the present invention provides a step-by-step electric control drum actuating means in which the movement is automatically continued after initiation thereof at exactly the most favorable speed relative to the apparatus to be controlled. The mechanical portions of the drum moving and latching means are interconnected to operate simultaneously thereby permitting an automatic return of the system to its original position. The system is therefore so simplified that only initiation of the operation by the operator is required which permits the maximum attention to other duties such as steering or watching the tracks.

Although but two embodiments of the present invention have been illustrated and described, it will be apparent to those skilled in the art that various changes and modifications may be made therein without departing from the spirit of the invention or from the scope of the appended claims.

The invention claimed is:

1. In a system for controlling electric motors, a controller biased to inoperative position and having a plurality of operative positions, operating means for imparting a step-by-step movement to said controller to several operative positions thereof, said operating means comprising an electromagnetically actuated device, a normally inoperative latch effective during said step-by-step movement of said controller to prevent return thereof, and a unitarily controlled device for initiating operation of said electromagnetically actuated device and for rendering said latch operative to prevent return movement of said controller, said unitarily controlled device being effective in one operative position thereof to cause said latch to hold said controller in an operative position and to prevent operation of the first said means.

2. In a system for controlling electric motors, a controller biased to inoperative position and having a plurality of operative positions, operating means for imparting a step-by-step movement to said controller to several operative positions thereof, said operating means comprising an electromagnetically actuated device, a normally inoperative latch effective during said step-by-step movement of said controller to prevent return thereof, a unitarily controlled device for initiating operation of said electromagnetically actuated device and for rendering said latch operative to prevent return movement of said controller, means operable responsive to flow of current in the motor circuit when above a predetermined value for preventing effective operation of said device, and voltage responsive means for insuring release of said unitarily controlled device from operative position on the occurrence of predetermined low voltage conditions.

3. In a system for controlling electric motors, a controller biased to inoperative position and having a plurality of operative positions, operating means for imparting a step-by-step movement to said controller to several operative positions thereof, said operating means comprising an electromagnetically actuated device, a normally inoperative latch effective during said step-by-step movement of said controller to prevent return thereof, a unitarily controlled device for initiating operation of said electromagnetically actuated device, and for rendering said latch operative to prevent return movement of said controller, voltage responsive means for insuring release of said unitarily controlled device from operative position on the occurrence of predetermined low voltage conditions, and retarding means for delaying release of said unitarily controlled device in response to low voltage conditions.

4. In a system for controlling electric motors, a controller biased to inoperative position and having a plurality of operative positions, operating means for imparting step-by-step movement to said controller to several operating positions thereof, said means comprising a ratchet associated with said controller and an electromagnetically actuated pawl operable to and from cooperative relation with said ratchet, a latch movable to and from co-operative relation with said ratchet to permit and to prevent return movement of said controller, movable means operable to one position thereof to permit movement of said pawl and of said latch to cooperative relation with said ratchet and operable to another position thereof to move said pawl and latch from said cooperative relation, and electromagnetically actuated means for causing the movement of the last said means to the said one position thereof.

5. In a system for controlling electric motors, a controller biased to inoperative position and having a plurality of operative positions, an electromagnetically operable device for imparting step-by-step movement to said controller to several operating positions thereof, a source of current for actuating said device, switch means for establishing operative connection of said source of current with said device, a normally inoperative latch operable during step-by-step movement of said controller to prevent return thereof, means operable to actuate said switch means to establish operative connection of said source of current with said device, and means mechanically associated with said last mentioned means for rendering said latch operative to prevent return movement of said controller.

6. In a system for controlling electric motors, a controller biased to inoperative position and having a plurality of operating positions, operating means for imparting step-by-step movement to said controller to several operating positions thereof, said means comprising a ratchet associated with said controller, a pawl operable to and from cooperative relation with said ratchet, and an electromagnetic device for actuating said pawl to said cooperative relation, a source of current for energizing said device, a switch for establishing operative connection of said source of current with said device, a latch operable to and from cooperative relation with said ratchet during said step-by-step movement of said controller to prevent return movement thereof, and means movable to one position thereof to permit movement of said pawl and latch to the said cooperative relations, and movable to another position thereof to move said pawl and latch from said cooperative relation, the movement of the last said means to the said one position thereof being operable to actuate said switch to establish operative connection of said source of current with said device.

TH. BUCHHOLD.